US012460550B2

United States Patent
Levisse et al.

(10) Patent No.: US 12,460,550 B2
(45) Date of Patent: Nov. 4, 2025

(54) FAN MODULE EQUIPPED WITH AN OIL TRANSFER DEVICE (71) Applicant: SAFRAN AIRCRAFT ENGINES, Paris (FR)

(72) Inventors: Paul Ghislain Albert Levisse, Moissy-Cramayel (FR); Caroline Marie Frantz, Moissy-Cramayel (FR); Didier Gabriel Bertrand Desombre, Moissy-Cramayel (FR); Christophe Marcel Lucien Perdrigeon, Moissy-Cramayel (FR); Jean-Claude Christian Taillant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/549,415

(22) PCT Filed: Mar. 15, 2022

(86) PCT No.: PCT/FR2022/050468
§ 371 (c)(1),
(2) Date: Sep. 7, 2023

(87) PCT Pub. No.: WO2022/195217
PCT Pub. Date: Sep. 22, 2022

(65) Prior Publication Data
US 2024/0151149 A1 May 9, 2024

(30) Foreign Application Priority Data
Mar. 16, 2021 (FR) ...................... 2102622

(51) Int. Cl.
*F01D 7/02* (2006.01)
*F01D 25/16* (2006.01)

(52) U.S. Cl.
CPC ............... *F01D 7/02* (2013.01); *F01D 25/16* (2013.01); *F05D 2220/323* (2013.01); *F05D 2240/30* (2013.01); *F05D 2260/60* (2013.01)

(58) Field of Classification Search
CPC ...... F01D 7/02; F01D 25/16; F05D 2220/323; F05D 2240/30; F05D 2260/60
See application file for complete search history.

(56) References Cited

U.S. PATENT DOCUMENTS 2,850,103 A * 9/1958 Pearl ....................... B64C 11/38
416/157 R
4,157,881 A * 6/1979 Kasuya ............... F16C 33/1045
417/407

(Continued)

FOREIGN PATENT DOCUMENTS

EP 3138771 A1 3/2017
EP 3179044 A1 6/2017

(Continued)

OTHER PUBLICATIONS

International Search Report received for PCT Patent Application No. PCT/FR2022/050468, mailed on Apr. 26, 2022, 6 pages (2 pages of English Translation and 4 pages of Original Document).

*Primary Examiner* — Nathaniel E Wiehe
*Assistant Examiner* — Aye S Htay
(74) *Attorney, Agent, or Firm* — WOMBLE BOND DICKINSON (US) LLP (57) ABSTRACT

A fan module for an aircraft turbine engine, the module including a fan having variable-pitch blades and an oil transfer device for transferring oil between a stator and a rotor, the device including a stator ring having a cylindrical inner surface and internal oil ducts and a shaft engaged in the ring and having a cylindrical outer surface and internal oil ducts; the device includes a plain bearing located between said cylindrical inner surface and the cylindrical outer (Continued)

surface and defined by a single band; and rolling bearings mounted between the ring and the shaft, on either side of the plain bearing, each of these rolling bearings having one of the rings thereof integrated in one of the elements selected from the ring and the shaft.

20 Claims, 5 Drawing Sheets

(56) References Cited

U.S. PATENT DOCUMENTS

| | | | | |
|---|---|---|---|---|
| 8,376,619 | B2* | 2/2013 | Akita | C10M 101/02 |
| | | | | 384/129 |
| 9,545,994 | B2* | 1/2017 | Gallet | B64C 11/306 |
| 9,638,203 | B2* | 5/2017 | Bucking | F16C 35/042 |
| 2004/0037483 | A1* | 2/2004 | Beauvais | F16C 33/6651 |
| | | | | 384/574 |
| 2010/0014976 | A1* | 1/2010 | Arel | B64C 11/38 |
| | | | | 416/117 |
| 2014/0186182 | A1* | 7/2014 | Gallet | B64C 11/38 |
| | | | | 416/147 |
| 2016/0319830 | A1* | 11/2016 | Sheridan | F04D 29/644 |
| 2017/0066523 | A1 | 3/2017 | Miszkiewicz | |
| 2017/0108110 | A1* | 4/2017 | Sheridan | F16N 31/00 |
| 2018/0172069 | A1* | 6/2018 | Askestad | F16C 23/08 |

FOREIGN PATENT DOCUMENTS

| | | |
|---|---|---|
| GB | 0824332 A | 11/1959 |
| WO | 2013/011225 A2 | 1/2013 |
| WO | 2015/102779 A1 | 7/2015 |

* cited by examiner

FAN MODULE EQUIPPED WITH AN OIL TRANSFER DEVICE

TECHNICAL FIELD OF THE INVENTION

The invention relates to a fan module for an aircraft turbine engine, this module comprising an oil transfer device.

TECHNICAL BACKGROUND

An aircraft turbine engine typically comprises a gas generator comprising, from upstream to downstream in the flowing orientation of the operating gases, at least one compressor, an annular combustion chamber and at least one turbine.

The gases entering the gas generator are compressed in the compressor or the compressors, then mixed with fuel and burnt in the combustion chamber. The combustion gases flow and expand in the turbine or the turbines to drive its rotor or rotors.

In the case of a turbine engine with double body, one low-pressure and one high-pressure, the rotor of the high-pressure turbine is connected by a high-pressure shaft to the rotor of the high-pressure compressor, and the rotor of the low-pressure turbine is connected by a low-pressure shaft to the rotor of the low-pressure compressor.

The turbine engine can be equipped with one or more shrouded or non-shrouded propellers. In the case of a shrouded propeller located upstream of the gas generator, this propeller is referred to as fan and is driven by the low-pressure shaft of the gas generator.

The fan generates a flow of gas during operation which is divided into a first flow, referred to as the primary flow, which flows into the gas generator as described above, and a second flow, referred to as the secondary flow, which flows around the gas generator.

The bypass ratio, which is the ratio of the secondary flow rate to the primary flow rate, is increasingly important in the modern turbine engine, resulting in an increase in the diameter of the fan and a reduction in the diameter of the gas generator.

To limit the speed of rotation of the fan, particularly in the turbine engines with a high bypass ratio, it is known to drive this fan by means of a reducer, generally of the epicyclic or planetary gear train type. The low-pressure shaft then drives the fan by means of the reducer.

A fan, or a propeller in general, may comprise variable pitch blades, i.e. each of the blades has an orientation about a radial axis that can be precisely adjusted. The blades are carried by a polygonal annulus-shaped hub and are displaced in rotation about these axes by means of a common hydraulic actuator mounted inside the hub. This actuator is supplied with oil and can be located in a rotating reference frame when it is secured in rotation to the hub and to the fan.

The turbine engine comprises a lubrication system comprising an oil reservoir and a pump, which is generally located in a stationary reference frame. It is therefore understood that the actuator must be supplied with oil from the lubrication system via an oil transfer device from a stationary reference frame to a rotating reference frame. A device of this type is commonly referred to as an OTB, an acronym for Oil Transfer Bearing.

This type of device can be mounted in a turbine engine with a fan of the type mentioned above to supply the actuator with oil and also to supply the reducer with lubricating oil. This type of device can also be mounted in another type of turbine engine, such as a turbine engine equipped with a non-shrouded propeller with variable pitch blades, of the turboprop type.

In the present technique, an oil transfer device comprises a stator annulus which comprises an internal cylindrical surface and internal oil pipes which each open onto this internal cylindrical surface. These pipes are connected by conduits to the above-mentioned lubrication system.

The device also comprises a shaft engaged in the annulus and movable in rotation about an axis inside this annulus. The shaft comprises an external cylindrical surface extending inside the internal cylindrical surface of the annulus, and internal oil pipes which each open onto this external cylindrical surface. These pipes are connected to the actuator by conduits to supply it with oil.

In the current technique, the external cylindrical surface of the shaft comprises annular grooves for housing annular sealing segments. These segments are able to displace in the grooves and are configured to rest radially on the internal surface of the annulus to limit and control oil leaks. The outlets of the above-mentioned pipes are located between two adjacent segments, thus ensuring that as much oil as possible from each pipe in the annulus is supplied to a corresponding pipe on the shaft. The number of segments is equal to twice the number of pipes. The document GB-A-824,332 describes an oil transfer device of this type.

However, this technology is unsatisfactory for a number of reasons. The deformation during operation (due to differential thermal expansion and stress) and the manufacturing and assembly tolerances of the parts make it difficult to control these leaks precisely. The device comprises many parts, which makes the assembly more complex. The manufacture and the assembly of such a device is therefore relatively long and costly. In addition, the greater the number of pipes in the device and the greater the number of sealing segments, the greater the axial dimension and therefore the axial overall dimension of the device for mounting these different segments. An oil transfer device can be complex to integrate into a turbine engine because of its overall dimension. Finally, the service life of such a device is generally limited due to potential misalignments between the shaft and the annulus during operation and wear on the sealing segments, which can be accentuated by these misalignments as well as by the speed of rotation of the shaft. The larger the diameter of the device, the greater the peripheral speed of the shaft and the greater the wear on the segments.

It would be advantageous to provide a plain bearing between the surfaces of the annulus and of the shaft. One solution would be to mount a first shrink ring on the internal surface of the annulus and a second shrink ring on the external surface of the shaft, so that these shrink rings define the plain bearing between them. These shrink rings would then comprise oil passage orifices in fluidic communication with the pipes of the annulus and of the shaft, in order to supply oil to the plain bearing. To maintain the clearance between the shrink rings and avoid misalignment between them, it may also be useful to provide rolling bearings on either side of the plain bearing, with internal and external rings mounted on the shaft and the annulus respectively.

However, this solution would not be satisfactory because the number of parts in the transfer device would be large (bearings with rollers and rings, shrink rings, etc.) and the assembly of the device would be complex and costly.

The invention thus proposes an improved oil transfer device which solves all or some of the problems of the prior technique.

The prior art also comprises the documents GB-A-824332, US-A1-2004/037483, EP-A1-3179044, WO-A1-2015/102779, WO-A2-2013/011225 and EP-A1-3138771.

SUMMARY OF THE INVENTION

The invention relates to a fan module for an aircraft turbine engine, this module comprising a fan which comprises a fan shaft and variable pitch fan vanes, and an oil transfer device configured to provide an oil transfer between a stator and an actuator which is secured in rotation to the fan shaft and which is configured to control the pitch of the fan vanes, this device comprising:
- a stator annulus comprising a first cylindrical surface, for example internal, and internal oil pipes which each open onto said first cylindrical surface, and
- a shaft engaged in or on said annulus and comprising a second cylindrical surface extending inside or around said first cylindrical surface, the shaft comprising internal oil pipes each opening onto said second cylindrical surface, characterised in that it further comprises:
- a plain bearing located between said first and second cylindrical surfaces, and
- rolling bearings mounted between the annulus and the shaft, on either side of the plain bearing, each of these rolling bearings comprising rolling elements between two annular rolling tracks, in that one of the elements selected from the annulus and the shaft carries rings defining first tracks of the rolling bearings, the second rolling tracks of these rolling bearings being integrated with the other of these elements, and in that the plain bearing is formed by a single shrink ring interposed between the first and second cylindrical surfaces and attached to one of said elements.

The invention thus proposes an oil transfer device with no sealing members or segments between the cylindrical surfaces facing the stator annulus and the shaft. Instead, a plain bearing is provided between these surfaces. Rolling bearings are mounted on either side of this plain bearing so as to guarantee the radial thickness of the plain bearing, whatever the speed of the turbine engine and the peripheral speed of the shaft of the transfer device. The rolling bearings are automatically lubricated by the oil that leaks from the plain bearing during operation. The rolling bearings also ensure the limitation of the oil leakage outside the plain bearing and the device. The rolling bearings also allow to eliminate the risk of misalignment between the annulus and the shaft, and therefore the risk of contact between them and wear. The sealing segments are therefore no longer wear parts of the device, which therefore has an optimised service life compared to the prior art.

In addition, the number of parts in the device is reduced by using a single shrink ring instead of two and by using rolling bearings with rings integrated into the annulus or into the shaft. This allows to limit the stacking of assembly and machining tolerances. The invention allows to facilitate the construction and the assembly of the device.

The module according to the invention may comprise one or more of the following characteristics, taken alone or in combination with each other:
- the rolling bearings are with rollers,
- one of the elements carries the rings of the rolling bearing and the shrink ring;
- the shrink ring has two cylindrical surfaces extending around each other, including a cylindrical shrink-fit surface and a cylindrical centering surface, this cylindrical centering surface having a diameter equal to the diameters of the second rolling tracks;
- the stator annulus carries the rings and the shrink ring;
- the rings of the rolling bearings have identical internal diameters;
- one of the elements carries the rings and the other of the elements carries the shrink ring;
- the annulus carries the shrink ring and the shaft carries the rings;
- the shrink ring has two cylindrical surfaces extending around each other, including a cylindrical shrink-fit surface on the annulus and a cylindrical centering surface on the shaft, the rings of the rolling bearings having internal diameters different from each other and different from the diameter of the internal cylindrical surface of the shrink ring;
- the shrink ring comprises orifices which are located opposite the outlets of the pipes of one of the elements, and which are in fluidic communication with the pipes of the other of the elements by means of annular gorges formed at the level of the outlets of the pipes of this other element;
- the fan is driven in rotation by a reducer, said device being mounted upstream of the reducer and being configured to supply oil to the reducer and to the actuator, and possibly also to the reducer,
- the fan is driven by a shaft guided by rolling bearings which is coupled to the shaft of the device,
- the reducer is of the planetary type, i.e. with a planet carrier immobile in rotation and therefore with a ring gear movable in rotation,
- the reducer is of the epicyclic type, i.e. with a ring gear that does not rotate and therefore with a planet carrier movable in rotation,
- the device supplies the reducer with lubricating oil, and in particular to at least some of its bearings and toothing,
- the device is configured to supply the actuator with an oil pressure of between 2 and 200 bar, and preferably between 5 and 130 bar,
- the device is configured to supply the reducer with an oil pressure of between 2 and 50 bar, and preferably between 5 and 20 bar.

The invention also relates to an aircraft turbine engine, comprising a module as described above.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
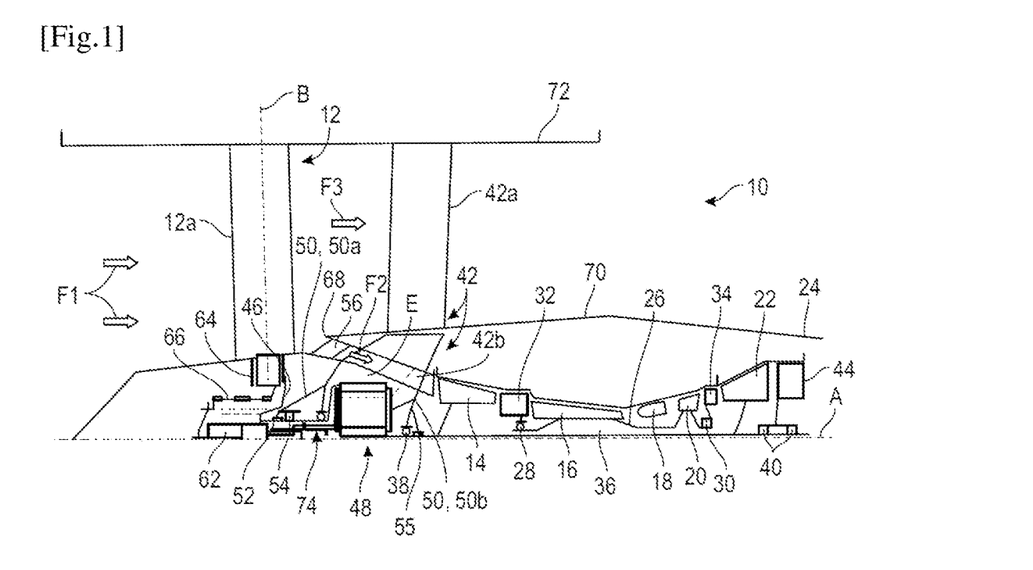
FIG. 1 is a schematic half-view in axial cross-section of a turbine engine equipped with an oil transfer device.

FIG. 1 shows a turbine engine 10 which typically comprises a fan 12, a low-pressure (LP) compressor 14, a high-pressure (HP) compressor 16, an annular combustion chamber 18, a high-pressure (HP) turbine 20, a low-pressure (LP) turbine 22 and an exhaust nozzle 24.

The rotors of the high-pressure compressor 16 and of the high-pressure turbine are connected by a high-pressure shaft 26 and together form a high-pressure (HP) body, which is guided in rotation about the longitudinal axis A of the turbine engine by rolling bearings 28, 30. A first bearing 28 is mounted between an upstream end of the shaft 26 and of the HP body and an inter-compressor casing 32 located between the compressors LP 14 and HP 16. A second bearing 30 is mounted between a downstream end of the shaft 26 and the HP body and an inter-turbine casing 34 located between the LP 22 and HP 24 turbines.

The rotors of the LP compressor 14 and of the LP turbine 22 are connected by a low-pressure shaft 36 and together form a low-pressure (LP) body which is guided in rotation about the longitudinal axis A of the turbine engine by rolling bearings (38, 40). At least one bearing 38 is mounted between an upstream end of the shaft 36 and of the LP body and an inlet casing 42 located upstream of the LP compressor 14. Other bearings 40 are mounted between a downstream end of the shaft 36 and of the LP body and an exhaust casing 44 located downstream of the LP turbine 22.

The fan 12 is driven by a fan shaft 46 which is driven by the LP shaft 36 by means of a reducer 48. This reducer 48 is generally of the planetary or epicyclic type.

The following description relates to a reducer of the planetary type, in which the planet carrier and the sun gear are movable in rotation, the ring gear of the reducer being stationary in the reference frame of the engine.

The reducer 48 is positioned in the upstream portion of the turbine engine. A stationary structure comprising schematically, here, an upstream portion 50a and a downstream portion 50b which makes up the engine casing or stator 50 is arranged so as to form an enclosure E surrounding the reducer 48. This enclosure E is closed upstream by a sealing 52 at the level of a bearing 54 through which the fan shaft 46 passes, and downstream by a sealing 55 at the level of a bearing 38 through which the LP shaft 36 passes.

The enclosure E is arranged inside the inlet casing 42, which is located between an inlet rectifier blading 56 and the LP compressor 14.

Figure 2:
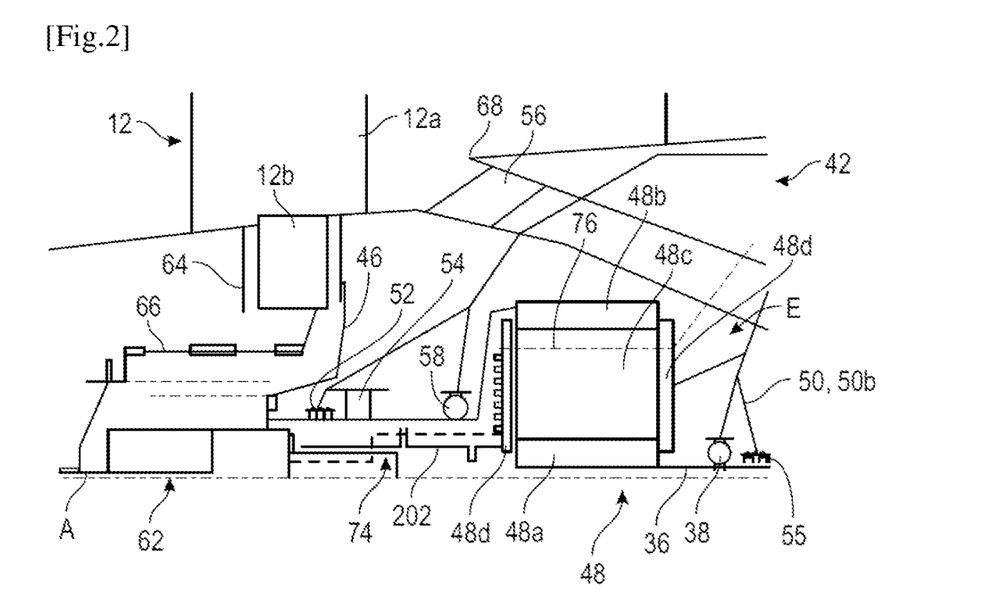
FIG. 2 is a larger scale view of a portion of FIG. 1.

FIG. 2 shows the reducer 48 on a larger scale.

The reducer 48 comprises a sun gear 48a centered on the axis A and coupled to the LP shaft 36 by means of splines, for example.

The reducer 48 comprises a ring gear 48b which is movable in rotation about the axis A and is connected to the fan shaft 46 to drive it in rotation. The ring gear 48b is guided by two bearings 54, 58 carried by the input casing 42, these bearings 54, 58 being located upstream of the reducer 48.

Finally, the reducer 48 comprises planet gears 48c arranged around the axis A and meshing with the sun gear 48a and the ring gear 48b. These planet gears 48c are carried by a planet carrier 48d which is attached to the inlet casing 42.

The fan 12 shown in FIG. 1 comprises variable pitch blades 12a and is associated with an actuator 62 which allows to control in a centralised manner the positioning of the blades 12a about their axes B, which are generally radial axes relative to the axis A of the turbine engine.

Each of the blades 12a comprises a foot 12b forming a pivot which is housed in a housing of a hub 64 in the form of a polygonal annulus, and which is connected by a connection system 66 connecting to a piston of the actuator 62.

The actuator 62 extends along the axis A and its piston is translationally movable along this axis, for example from a first position in which the blades 12a are feathered to a second position in which the blades 12a obstruct the passage of air through the fan 12.

The airflow F1 which passes through the fan 12 is divided into two annular and coaxial flows downstream of the fan by an annular separator 68 which extends around the blading 56. A first air flow, referred to as the primary flow F2, flows in a primary duct passes through this blading 56 and flows into the compressors 14 and 16 to be compressed. This compressed air is then mixed with fuel and burnt in the combustion chamber 18. The combustion gases are then expanded in the turbines 20, 22 to drive their rotors and the LP 36 and HP 26 shafts, then flow into the nozzle 24.

A second air flow, referred to as the secondary flow F3, flows in a secondary duct which is defined internally by an annular engine casing 70 which extends longitudinally around the compressors 14, 16, the combustion chamber 18 and the turbines 20, 22, and outwardly by an annular nacelle casing 72 which extends longitudinally around the fan 12 and a portion of the engine. This nacelle casing 72 is connected to the engine by outlet guide vanes 42a from the inlet casing 42. These guide vanes 42a are structural and are configured to straighten the flow of air leaving the fan 12.

The actuator 62 is hydraulic and operates with a fluid, oil, which comes from a lubrication system located generally in the nacelle or between the compressors 14, 16 and the casing 70 (i.e. in the engine) and therefore in a stationary reference frame of the turbine engine. In contrast, the actuator 62 is located in a rotating reference frame.

As can be seen in FIG. 2, the turbine engine 10 comprises a device 74 for transferring oil from the stationary reference frame of the engine to the rotating frame in which the actuator 62 is located.

In the example shown, the device 74 is located upstream of the reducer 48 and comprises one or more oil supply ways 76 for supplying the actuator 62 and possibly also for lubricating the reducer 48.

The dotted line in FIG. 2 symbolises one of these ways along its entire path, from the stationary reference frame to the actuator 62: through the primary duct to the device 74, through the reducer 48 (between its planet gears or through the axles of these planet gears), and along the planet carrier and then the fan shaft 46.

Figure 3:
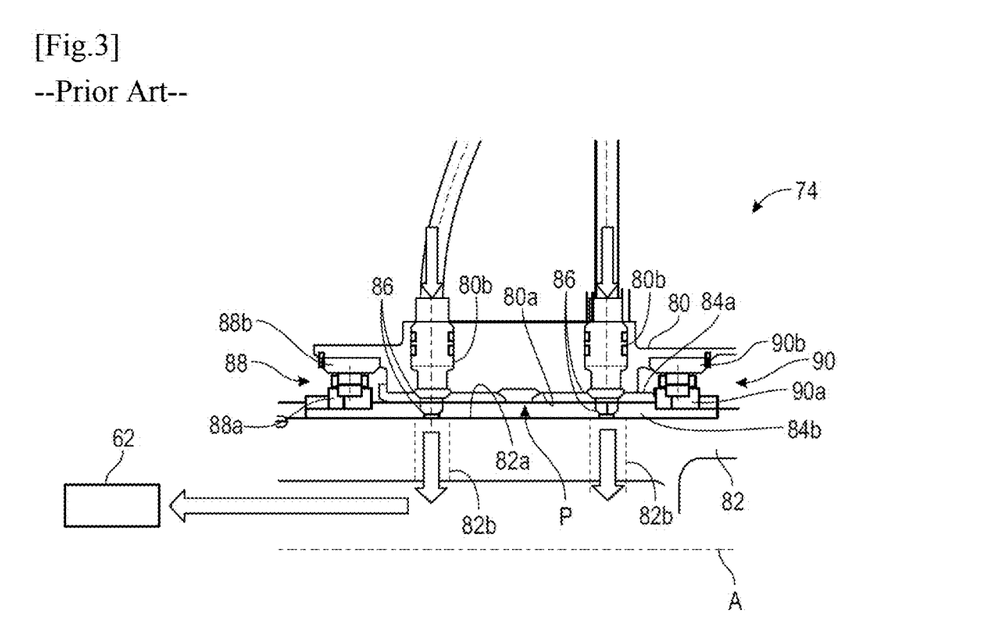
FIG. 3 is schematic half-view in axial cross-section of an oil transfer device in the prior art.

FIG. 3 illustrates an oil transfer device 74 comprising:
- a stator annulus 80 comprising an internal cylindrical surface 80a and internal oil pipes 80b each opening onto said internal cylindrical surface 80a,
- a shaft 82 engaged in the stator annulus 80 and movable in rotation about the axis A inside this annulus 80, the shaft 82 comprising an external cylindrical surface 82a extending inside the surface 80a, and internal oil pipes 82b which each open onto the surface 82a.

A plain bearing P is arranged between the surfaces 80a, 82a. To do this, a first shrink ring 84a is mounted in the annulus 80 and covers its internal surface 80a, and a second shrink ring 84b is mounted on the shaft 82 and covers its external surface 82a.

The shrink rings allow a precise machining of the surfaces of the plain bearing, this machining being more difficult when carried out directly on a part, particularly inside the annulus. These shrink rings 84a, 84b define between them the plain bearing P and comprise orifices 86 for the passage of oil in fluidic communication with the pipes 80b, 82b of the annulus 80 and of the shaft 82, in order to supply the plain bearing P with oil.

Rolling bearings 88, 90 are mounted between the annulus 80 and the shaft, 82, on either side of the plain bearing P. Each of these bearings 88, 90 comprises an internal ring 88a, 90a which is mounted on the shrink ring 84b and an external ring 88b, 90b which is mounted in the annulus 80.

This technology has a number of problems, as described above.

Figure 4:
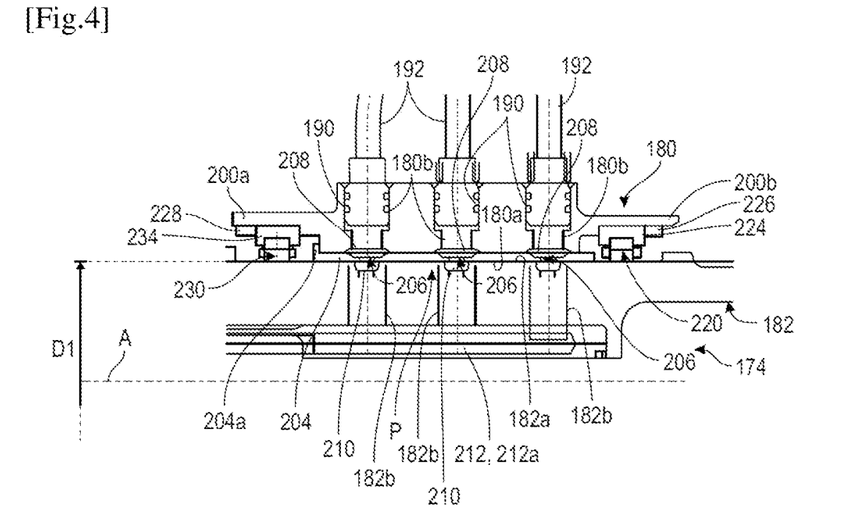
FIG. 4 is a schematic half-view in axial cross-section of an oil transfer device according to a first embodiment of the invention.

The present invention allows to remedy some or all of these problems by means of an oil transfer device, a first embodiment of which is illustrated in FIG. 4.

The reference numbers used in the foregoing to designate certain elements are used in the following description and in FIGS. 6 and 7 insofar as they designate these same elements.

The oil transfer device 174 of FIG. 4 also comprises a stator annulus 180 and a shaft 182 engaged in the stator annulus 180 and movable in rotation about the axis A inside this annulus 180.

The annulus 180 comprises an internal cylindrical surface 180a and internal oil pipes 180b, each of which opens onto the surface 180a. The pipes 180b all have a radial orientation and are arranged one behind the other along the axis A. There are three of them in the example shown.

Although the pipes 180b are shown here in a same axial plane, they could be located in different axial planes. This depends in particular on the conduits 192 to which they are connected and the arms 42b through which these conduits pass. In yet another variant, the pipes 180b could comprise radially external ends located in a same axial plane and ends distributed angularly around the axis A and opening onto the surface 180a.

Each of the pipes 180b comprises a radially internal end which forms the aforementioned opening and a radially external end which forms a connecting port 190 for connecting to an oil conduit 192. The port 190 forms a female portion and one end of the conduit 192 forms a male portion engaged in a sealing manner in the port 190. These conduits 192 are intended to pass through the stator of the reducer 48, the tubular arms 42b of the inlet casing 42, which are located in the flowing duct of the primary flow F2, and then the guide vanes 42a, which are located in the flowing duct of the secondary flow F3, to reach the lubrication system located in the nacelle (see FIG. 1). Alternatively, the lubrication system can be mounted in the engine (between the primary duct— compressors 14 and 16) and the casing 70 of the secondary duct, so that these conduits 192 do not pass through the secondary flow F3.

The annulus 180 is generally cylindrical in shape and comprises an upstream cylindrical rim 200a and a downstream cylindrical rim 200b. These rims 200a, 200b have identical or similar diameters.

As shown schematically in FIG. 2, the annulus 180 can be connected with a flexible connection to the planet carrier 48d. In the example shown, this flexible connection comprises a bellows-shaped wall 202.

A shrink ring 204 is attached inside the annulus 180 so as to cover its surface 180a. This shrink ring 204 extends over a major portion of the length of the annulus 180 and comprises a radially external annular rim 204a at its upstream end which bears axially against a cylindrical bearing surface of the annulus 180. As its name suggests, the shrink ring 204 is shrink-fitted into the annulus 180. The shrink-fit associated with the support of its rim 204a ensures that the shrink ring 204 is immobilised with respect to the annulus 180.

The shrink ring 204 comprises an annular row of radial orifices 206 in line with each of the pipes 180b. In addition, an annular gorge 208 is formed at the internal periphery of the annulus 180 and in line with each of the pipes 180b, this gorge 208 being closed on the inside by the shrink ring 204. It is therefore understood that each pipe 180b supply a gorge 208 and that each gorge 208 distributes oil to the orifices 206 of the shrink ring 204.

The shrink ring 204 comprises an external cylindrical shrink-fit surface which is in contact with the internal surface 180a of the annulus 180, and an internal cylindrical centering surface intended to be separated by a predetermined radial distance from the external surface 182a of the shaft 182 to define the plain bearing P.

The shaft 182 has no shrink ring. This will allow to reduce the number of tolerance stacking interfaces by three. Consequently, the resulting tolerance on the clearances is greatly reduced by reducing the number of contributors and therefore the resulting clearances are reduced, in particular between rotor and stator.

The shaft 182 comprises an external cylindrical surface 182a extending inside the surface 180a and internal oil pipes 182b each opening onto the surface 182a. The pipes 182b all have a radial orientation and are arranged one behind the other along the axis A. There are three of them in the example shown.

An annular gorge 210 is formed at the external periphery of the shaft 182 and in line with each of the pipes 182b.

Each of the pipes 182b is connected to a conduit 212 which can be integrated into the shaft 182. The conduits 212 extend axially in the shaft 182 and each of these conduits 212 comprises a downstream end connected to one of the pipes 182b. The upstream ends of the conduits 212 open upstream of the shaft 182 and one of these conduits 212, for example the one visible in cross-section in the figures, is for example connected to the aforementioned actuator 62.

A first rolling bearing 220 is mounted between the rim 200b of the annulus 180 and the downstream end of the shaft 182.

The bearing 220 is a rolling bearing and comprises rollers arranged between two rolling tracks, an internal and an external respectively.

The internal rolling track of the bearing 220 is integrated into the shaft 182, i.e. there is no internal ring fitted to the shaft 182 for the bearing 220.

The external rolling track of the bearing 220 is formed by an external ring 224 mounted inside the rim 200b. This ring 224 rests axially on a cylindrical bearing surface on the internal periphery of the upstream rim 200b. Downstream, the ring 224 is held axially by a nut 226 screwed to the internal periphery of the rim 200b or a shrink ring engaged in this rim.

The internal rolling track of the bearing 230 is integrated into the shaft 182, i.e. there is no internal ring fitted to the shaft 182 for the bearing 230.

The external rolling track of the bearing 230 is formed by an external ring 234 mounted inside the rim 200a. This ring 234 rests axially on a cylindrical bearing surface on the internal periphery of the downstream rim 200a. Upstream, the ring 234 is held axially by a nut 228 screwed to the internal periphery of the rim 200a or a shrink ring engaged in this rim.

Advantageously, as can be seen in FIG. 4, the external surface 182a of the shaft 182 and the internal rolling tracks of the bearings 220 (integrated to the shaft 182) have a same diameter D1 and extend continuously as an extension of each other. It is thus understood that the shaft 182 can be mounted inside the annulus 180 by axial translation, the annulus 180 being able to be pre-equipped with the shrink ring 204 and the rings 224, 234 and the rollers of the bearings 220, 230 just before this translation.

Figure 5:
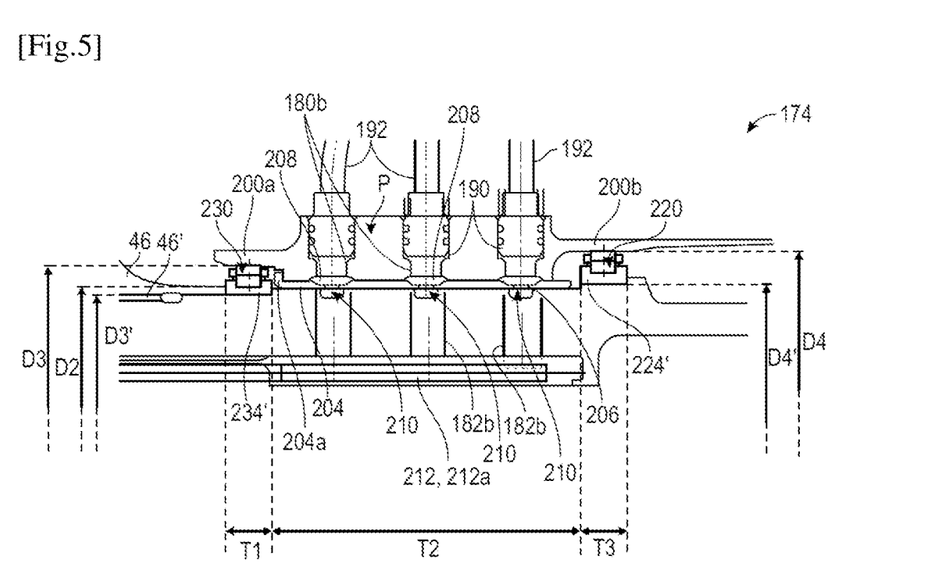
FIG. 5 is a schematic half-view in axial cross-section of an oil transfer device according to a second embodiment of the invention.

A second embodiment of the invention is shown in FIG. 5. This embodiment is very similar to the previous embodiment and differs essentially in that the external rolling tracks of the bearings 220, 230 are integrated into the annulus 180 and, in contrast, the internal rolling tracks of these bearings are formed by internal rings 224', 234' mounted on the shaft 182.

The upstream bearing 230 has an external diameter D3 defined by the rolling track integrated into the annulus 180, and an internal diameter D3' defined by the internal ring 234'. The downstream bearing 220 has an external diameter D4 defined by the rolling track integrated into the annulus 180, and an internal diameter D4' defined by the internal ring 224'.

In the example shown, D2 is between D3 and D3', and D2 is less than D4 and D4'. Furthermore, D3'<D4'<D3<D4.

It can thus be seen that the shaft 182 is stepped and comprises stretches of different diameters on which the rings 224', 234' of the bearings 220, 230 are mounted and around which the shrink ring 204 extends. The shaft 182 comprises an upstream stretch T1 of smaller diameter D3' for mounting the bearing 230, an intermediate stretch of diameter D2 for forming the plain bearing P, and a downstream stretch of diameter D4' for mounting the bearing 220.

Similarly, the annulus 180 is stepped and comprises stretches of different internal diameters in which the bearings 220, 230 and the shrink ring 204 are mounted. The cylindrical rims 200a, 200b thus have different internal diameters.

This embodiment allows to reduce the number of tolerance contributors. Consequently, the resulting tolerance on the clearances is greatly reduced by reducing the number of contributors and therefore the resulting clearances are reduced, in particular between rotor and stator.

In the example shown in FIGS. 2 and 5, it can be seen that the fan 12 is driven by a shaft 46 which is guided by bearings 54, 58 and which is coupled to the shaft 182 of the device 174.

The device 174 shown in FIG. 5 can be mounted as follows. The ring 224' and the rollers of the bearing 220 are first mounted on the shaft 182, by axial translation from upstream, until they come into axial abutment on a cylindrical shoulder of the shaft 182. The shaft 182 is then engaged in the annulus 180 by axial translation from downstream, until the rollers of the bearing 220 are engaged in the rim 200b of the annulus 180. The ring 234' and the rollers of the bearing 230 are then mounted on the shaft 182, by axial translation from upstream, until they come into axial abutment on a cylindrical shoulder of the shaft 182. The rollers of this bearing 230 are then engaged in the rim 200a of the annulus 180. Finally, the shaft 46 is mounted on the shaft 182, by axial translation from upstream, until it comes into axial abutment on the internal ring of the bearing 130. The shafts 46, 182 are secured in rotation by complementary sets of splines 46'. The shafts 46, 182 are attached to the actuator 62 to supply oil to its chambers.

The plain bearing P is supplied with oil directly via the pipes 180b of the annulus 180. It is understood that the thickness of the space is calculated so that controlled leakage takes place at the interfaces between the pipes 180b, 182b, so as to supply the plain bearing P. The oil then spreads over the entire axial extent of the plain bearing P and as far as the rolling bearings 220, 230 in order to lubricate them.

The radial thickness of the plain bearing is, for example, between 20 and 40 µm.

By "way" of the device 174 is meant the association of a pipe 180b of the annulus 180 with a pipe 182b of the shaft 182. In the example shown, the device 174 comprises three ways. Preferably, one of the ways is used for the oil supply to the actuator 62, and another of the ways is used for the oil return from the actuator 62. Finally, the last way can be used for the hydraulic protection of the actuator or to supply oil to the reducer 48.

In a variant embodiment not shown, the device could be mounted downstream of the reducer. The shaft of the device would then be rotationally coupled to the planet carrier of the reducer, for example, if the latter were movable in rotation.

The device 174 is configured, for example, to supply the actuator 62 with an oil pressure of between 2 and 200 bar, and preferably between 5 and 130 bar.

The invention claimed is:

1. A fan module for an aircraft turbine engine, the module comprising a fan which comprises a fan shaft and variable pitch fan vanes, and an oil transfer device configured to ensure a transfer of oil between a stator and an actuator that is secured in rotation to the fan shaft and that is configured to control the pitch of the fan vanes, the device comprising:
   a stator annulus comprising a first cylindrical surface and first internal oil pipes which each open onto said first cylindrical surface, and
   a shaft engaged in said annulus and comprising a second cylindrical surface extending inside said first cylindrical surface, the shaft comprising second internal oil pipes which each open onto said second cylindrical surface,
   wherein said fan module further comprises:
   a plain bearing (P) located between said first and second cylindrical surfaces, and
   upstream and downstream rolling bearings mounted between the annulus and the shaft, on either side of the plain bearing (P), each of the upstream and downstream rolling bearings comprising rolling members between a first annular rolling track and a second annular rolling track,
   and one of the annulus and the shaft is a first element and the other is a second element,
   wherein the first element carries rings defining the first rolling tracks of the upstream and downstream rolling bearings, the second rolling tracks of the upstream and downstream rolling bearings being integrally formed with the second elements such that the second rolling tracks of the upstream and downstream rolling bearings and the second elements form one single piece,
   and the plain bearing (P) is formed by a single shrink ring interposed between the first and second cylindrical surfaces and attached to one of said elements.

2. The module according to claim 1, wherein one of the elements carries the rings of the upstream and downstream rolling bearings and the shrink ring.

3. The module according to claim 2, wherein the shrink ring has two cylindrical surfaces extending around each other, including a cylindrical shrink-fit surface and a cylindrical centering surface, the cylindrical centering surface having a diameter (D1) equal to the diameters of the second rolling tracks.

4. The module according to claim 2, wherein the annulus carries the rings and the shrink ring.

5. The module according to claim 4, wherein the rings of the upstream and downstream rolling bearings have identical internal diameters (D1).

6. The module according to claim 1, wherein one of the elements carries the rings and the other of the elements carries the shrink ring.

7. The module according to claim 6, wherein the annulus carries the shrink ring and the shaft carries the rings.

8. The module according to claim 7, wherein the shrink ring has two cylindrical surfaces extending around each other, including a cylindrical shrink-fit surface on the annulus and a cylindrical centering surface on the shaft, the rings of the upstream and downstream rolling bearings having internal diameters (D3', D4') different from each other and different from the diameter (D2) of the internal cylindrical surface of the shrink ring.

9. The module according to claim 1, wherein the shrink ring comprises orifices which are on the one hand located opposite the outlets of the pipes of one of the elements, and which are in fluidic communication with the pipes of the other of the elements by means of annular gorges formed at the level of the outlets of the pipes of this other element.

10. The module according to claim 1, wherein the fan is driven in rotation by a reducer, said device being mounted upstream of the reducer and being configured to supply oil to the reducer and to the actuator.

11. The module according to claim 10, wherein the fan is driven by a fan shaft which is guided by rolling bearings and which is coupled to the fan shaft of the device.

12. The module according to claim 1, wherein the rolling members of the upstream and downstream rolling bearings are directly in contact with the annulus when the second elements is the annulus, and the rolling members of the rolling bearings being directly in contact with the shaft when the second elements is the shaft.

13. The module according to claim 1, wherein each of the second rolling tracks of the upstream and downstream rolling bearings is formed by an internal face of the annulus when the second elements is the annulus, and each of the second rolling tracks of the upstream and downstream rolling bearings being formed by an external face of the shaft when the second elements is the shaft.

14. The module according to claim 1, wherein the single shrink ring extends continuously from an upstream end of the first cylindrical surface of the annulus to a downstream end of the first cylindrical surface of the annulus.

15. The module according to claim 1, wherein the single shrink ring extends continuously over the entire axial dimension of the first cylindrical surface of the annulus.

16. The module according to claim 1, wherein the shrink ring is arranged axially between the upstream and downstream rolling bearings, a downstream end of the upstream rolling bearing being separated from an upstream end of the shrink ring by an upstream axial clearance, an upstream end of the downstream rolling bearing being separated from a downstream end of the shrink ring by a downstream axial clearance.

17. The module according to claim 1, wherein the shrink ring is arranged axially between the upstream and downstream rolling bearings, a downstream end of the ring of the upstream rolling bearing being separated from an upstream end of the shrink ring by an upstream axial clearance, an upstream end of the ring of the downstream rolling bearing being separated from a downstream end of the shrink ring by a downstream axial clearance.

18. The module according to claim 1, wherein the annulus carries the shrink ring and the shaft carries the rings, the shrink ring having two cylindrical surfaces extending around each other, including a cylindrical shrink-fit surface on the annulus and a cylindrical centering surface on the shaft, the rings of the upstream and downstream rolling bearings having internal diameters (D3', D4') different from each other and different from the diameter (D2) of the internal cylindrical surface of the shrink ring, the diameter of the external cylindrical surface of the shrink ring being greater than the internal diameter (D4') of the ring of the downstream rolling bearing.

19. The module according to claim 1, wherein the annulus carries the shrink ring and the shaft carries the rings, the shrink ring having two cylindrical surfaces extending around each other, including a cylindrical shrink-fit surface on the annulus and a cylindrical centering surface on the shaft, the upstream and downstream rolling bearings having internal diameters (D3', D4') different from each other and different from the diameter (D2) of the internal cylindrical surface of the shrink ring, the upstream rolling bearing having external diameter (D3) which is between the internal diameter (D4') of the downstream rolling bearing and the external diameter (D4) of the downstream rolling bearing.

20. The module according to claim 1, wherein the fan is driven in rotation by a reducer, said device being mounted upstream of the reducer and being configured to supply oil to the reducer and to the actuator, the shaft of the device being coupled to a planet carrier or a ring gear of the reducer, the fan being driven by a fan shaft which is guided by rolling bearings and which is coupled to the shaft of the device.

* * * * *